US012732036B2

(12) United States Patent
Joshi et al.

(10) Patent No.: US 12,732,036 B2
(45) Date of Patent: Sep. 8, 2026

(54) THERMAL MANAGEMENT OF ELECTRIC MOTOR HAVING COOLING SLEEVE AND THERMALLY-CONDUCTIVE DISSIPATION CAP THERMALLY CONNECTED TO COOLING SLEEVE

(71) Applicant: Hamilton Sundstrand Corporation, Charlotte, NC (US)

(72) Inventors: Ashutosh Joshi, Roscoe, IL (US); Debabrata Pal, Hoffman Estates, IL (US); Joseph K. Coldwate, Roscoe, IL (US); Jackson Steele, Rockford, IL (US); Viktor Kilchyk, Buffalo, NY (US); John Paliulis, So. Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 197 days.

(21) Appl. No.: 18/760,828

(22) Filed: Jul. 1, 2024

(65) Prior Publication Data

US 2026/0005559 A1 Jan. 1, 2026

(51) Int. Cl.
*H02K 1/20* (2006.01)
*H02K 1/16* (2006.01)
*H02K 9/19* (2006.01)

(52) U.S. Cl.
CPC ................. *H02K 1/20* (2013.01); *H02K 1/16* (2013.01); *H02K 9/19* (2013.01)

(58) Field of Classification Search
CPC ........... H02K 1/20; H02K 1/16; H02K 3/522; H02K 3/24; H02K 9/22; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 5/20; H02K 5/04; H02N 15/00

(Continued)

(56) References Cited

U.S. PATENT DOCUMENTS

| | | | | |
|---|---|---|---|---|
| 2,074,067 A * | 3/1937 | Darnell | .................... | H02K 9/06 310/52 |
| 2,114,907 A * | 4/1938 | Oesterlein | ................ | H02K 9/14 415/232 |

(Continued)

FOREIGN PATENT DOCUMENTS

| | | | | |
|---|---|---|---|---|
| DE | 102022209053 A1 * | 2/2024 | ............. | H02K 9/223 |

OTHER PUBLICATIONS

DE-102022209053-A1 English Translation.*

*Primary Examiner* — Maged M Almawri

(57) ABSTRACT

A motor includes a housing. The motor includes a stator with a plurality of slots disposed axially along an axis of rotation of a rotor, the stator having a first end and a second end, wherein the first end and second end are separated along the axis of rotation of the rotor. The motor includes stator windings disposed on the plurality of slots, the stator windings comprising a core set of windings, a first set of end turns proximate to the first end, and a second set of end turns proximate to the second end. The motor includes a cooling sleeve surrounding the stator windings, the cooling sleeve having a first opening proximate to the first end of the stator, and a second opening proximate to the second end of the stator and a thermally conductive dissipation cap thermally connected to the cooling sleeve.

20 Claims, 9 Drawing Sheets

(58) Field of Classification Search
USPC ...... 310/52, 58, 57, 59, 60, 89, 63, 62, 194, 310/54, 214, 43, 65, 60 A
See application file for complete search history.

(56) References Cited

U.S. PATENT DOCUMENTS

| | | | | |
|---|---|---|---|---|
| 3,610,975 | A * | 10/1971 | Onjanow | H02K 9/18 416/93 R |
| 4,164,672 | A * | 8/1979 | Flick | H02K 3/00 310/179 |
| 4,959,570 | A | 9/1990 | Nakamura et al. | |
| 5,619,956 | A * | 4/1997 | Koziara | H02K 7/1815 123/41.31 |
| 5,808,391 | A | 9/1998 | Avakian et al. | |
| 6,142,734 | A * | 11/2000 | Lee | B22C 7/06 249/117 |
| 7,834,492 | B2 | 11/2010 | Tund et al. | |
| 8,093,770 | B1 * | 1/2012 | Berhan | H02K 9/19 310/58 |
| 8,525,375 | B2 | 9/2013 | Pal | |
| 9,388,700 | B2 * | 7/2016 | Propheter-Hinckley | F01D 5/187 |
| 10,418,881 | B2 * | 9/2019 | Tamura | H02K 9/19 |
| 10,461,595 | B2 | 10/2019 | Teter et al. | |
| 10,536,055 | B2 * | 1/2020 | Hanumalagutti | H02K 3/24 |
| 11,146,146 | B2 | 10/2021 | Gerstler | |
| 12,418,219 | B2 * | 9/2025 | Hua | H02K 5/04 |
| 2010/0007227 | A1 * | 1/2010 | Smith | H02K 5/203 310/64 |
| 2010/0126703 | A1 * | 5/2010 | Ruan | H02K 9/225 165/104.33 |
| 2011/0168356 | A1 * | 7/2011 | Knight | H02K 11/33 165/104.19 |
| 2012/0025638 | A1 * | 2/2012 | Palafox | H02K 9/10 310/52 |
| 2012/0062056 | A1 * | 3/2012 | Bradfield | H02K 9/00 310/58 |
| 2015/0028727 | A1 * | 1/2015 | Watanabe | H02K 1/2706 310/60 A |
| 2015/0308456 | A1 | 10/2015 | Thompson et al. | |
| 2016/0294231 | A1 * | 10/2016 | Andres | H02K 5/18 |
| 2018/0205299 | A1 * | 7/2018 | Huang | H02K 3/12 |
| 2020/0313499 | A1 | 10/2020 | Spierling | |
| 2021/0135516 | A1 * | 5/2021 | Page | H02K 5/203 |

* cited by examiner

THERMAL MANAGEMENT OF ELECTRIC MOTOR HAVING COOLING SLEEVE AND THERMALLY-CONDUCTIVE DISSIPATION CAP THERMALLY CONNECTED TO COOLING SLEEVE

TECHNICAL FIELD

This disclosure relates generally to electrical motors suitable for aerospace applications. More specifically, this disclosure relates to an apparatus for thermal management for an electrical motor and methods for implementing such thermal management.

BACKGROUND

High-speed AC electrical motors (for example, motors having operational speeds on the order of ~80,000 revolutions per minute) are necessary for many aerospace applications. To help achieve such high rotational speeds, low-pole (for example, two or four pole) stator winding structures are utilized. However, implementing low-pole stator windings can result in windings with end-turns with comparatively (versus slower motors, or motors with more poles) large volumes of bundled wire. Typically, such high-speed motors use two modes of air cooling, comprising a first mode, used during flight, wherein fast-moving ram air from outside the aircraft is directed towards the motor stator, and a second mode, used when the aircraft is grounded, wherein compressed air is directed towards the motor stator. Testing and experience have shown that the aforementioned modes of cooling do not uniformly cool motors, leading to detrimentally asymmetric heat build-up, particularly in the bundled wires comprising the end-turns of low-pole count motors. Such detrimental heat build-up can degrade the insulation of windings in and around the end-turns, shortening the use life of the motor and increasing the possibility of motor burnout. Accordingly, achieving uniform rejection of heat across all regions of high-speed AC electrical motors remains a source of technical challenges and opportunities for improvement in the art.

SUMMARY

This disclosure relates to thermal management for an electric motor.

In some examples, a motor includes a housing. The motor includes a stator with a plurality of slots disposed axially along an axis of rotation of a rotor, the stator having a first end and a second end, wherein the first end and second end are separated along the axis of rotation of the rotor. The motor includes stator windings disposed on the plurality of slots, the stator windings comprising a core set of windings, a first set of end turns proximate to the first end, and a second set of end turns proximate to the second end. The motor includes a cooling sleeve surrounding the stator windings, the cooling sleeve having a first opening proximate to the first end of the stator, and a second opening proximate to the second end of the stator and a thermally conductive dissipation cap thermally connected to the cooling sleeve.

In various embodiments, an apparatus includes a cooling sleeve, comprising a section of a thermally conductive material having a first opening proportioned to accommodate a first end of a stator, and a second opening proportioned to accommodate second end of the stator and a thermally conductive dissipation cap thermally connected to the cooling sleeve.

In certain embodiments, a method of providing thermal management of an electric motor includes providing a housing, providing a stator with a plurality of slots disposed axially along an axis of rotation of a rotor, the stator having a first end and a second end, wherein the first end and second end are separated along the axis of rotation of the rotor, and providing stator windings disposed on the plurality of slots, the stator windings comprising a core set of windings, a first set of end turns proximate to the first end, and a second set of end turns proximate to the second end. The method further includes providing a cooling sleeve surrounding the stator windings, the cooling sleeve having a first opening proximate to the first end of the stator, and a second opening proximate to the second end of the stator and providing a thermally conductive dissipation cap thermally connected to the cooling sleeve.

Any single one or any combination of the following features may be used with the examples above. The cooling sleeve can include one or more cooling channels for passage of cooling fluid within the sleeve. A dielectric film with high thermal conductivity can be disposed between an interior of the cooling sleeve and the stator windings, and wherein the dielectric film contacts both the cooling sleeve and the stator windings. The dielectric film with high thermal conductivity can be one or more of a poly-oxydiphenylene-pyromellitimide based film, an $Al_2O_3$-based ceramic film, or an AlN-based ceramic film. The thermally conductive dissipation cap can include a flange comprising a first interior surface configured to mate with an axial end of the first set of end turns, such that the thermally conductive dissipation cap comprises a frustum connected to the flange, comprising a second interior surface configured to mate with the first set of end turns between the axial end of the first set of end turns and the core set of windings. The flange of the thermally conductive dissipation cap can directly contact the first opening of the cooling sleeve. The thermally conductive dissipation cap can include a back iron sleeve, the back iron sleeve comprising a cylindrical section of thermally conductive material extending from the flange towards the core set of windings parallel to the axis of rotation. The motor can include a heat pipe connecting the cooling sleeve and the thermally conductive dissipation cap, such that the cooling sleeve and the thermally conductive dissipation cap do not directly contact each other. The thermally conductive dissipation cap can include a back iron sleeve, the back iron sleeve comprising a cylindrical section of thermally conductive material extending from the cap towards the core set of windings parallel to the axis of rotation, such that the heat pipe extends from the back iron sleeve towards the cooling sleeve. The heat pipe is "L" shaped and contacts at least a portion of the cap.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
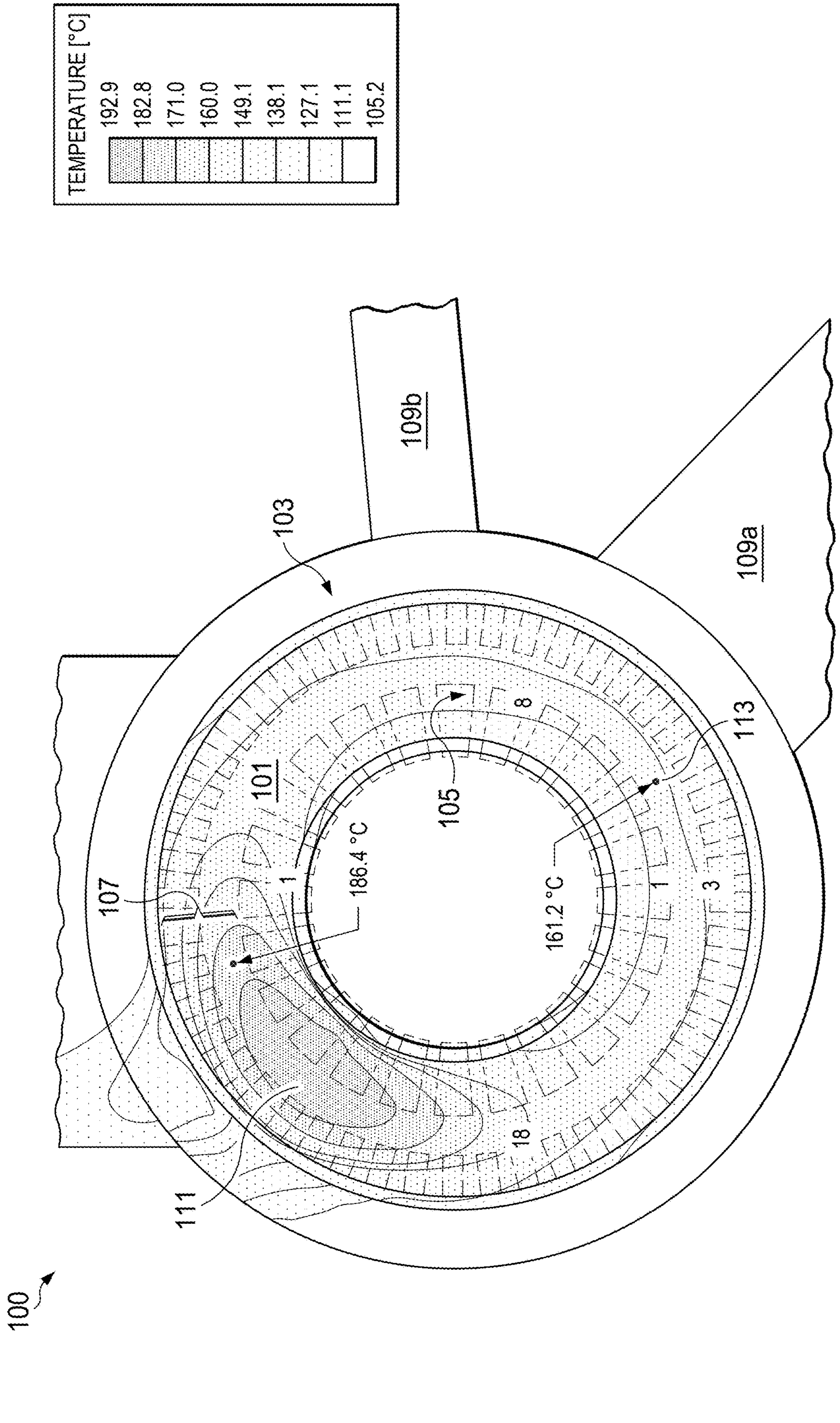
FIG. 1 illustrates certain technical problems addressed by embodiments according to this disclosure.
Figure 2A:
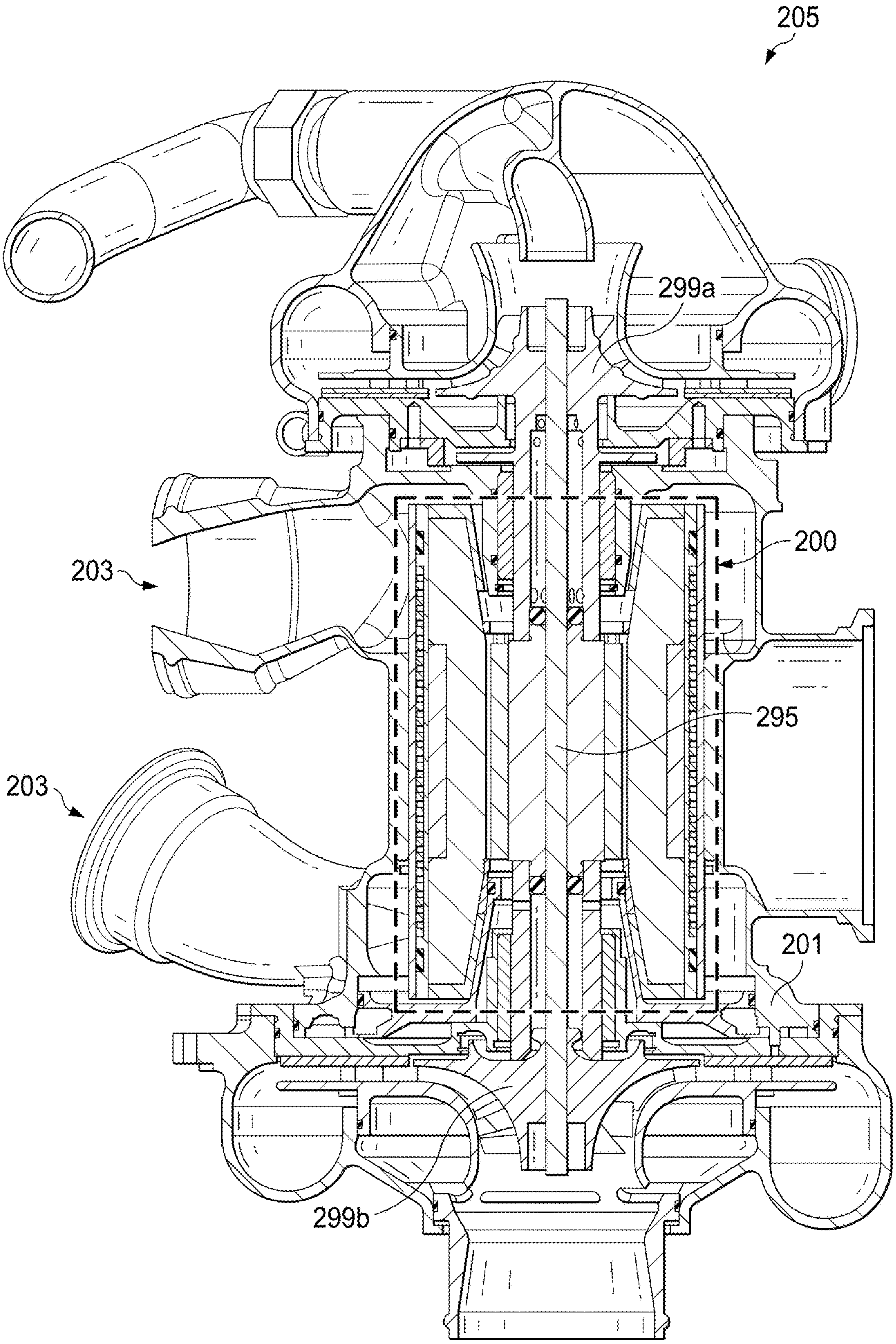
FIGS. 2A through 2G illustrate examples of a motor utilizing dissipation caps and cooling sleeves according to embodiments of this disclosure.
Figure 2B:
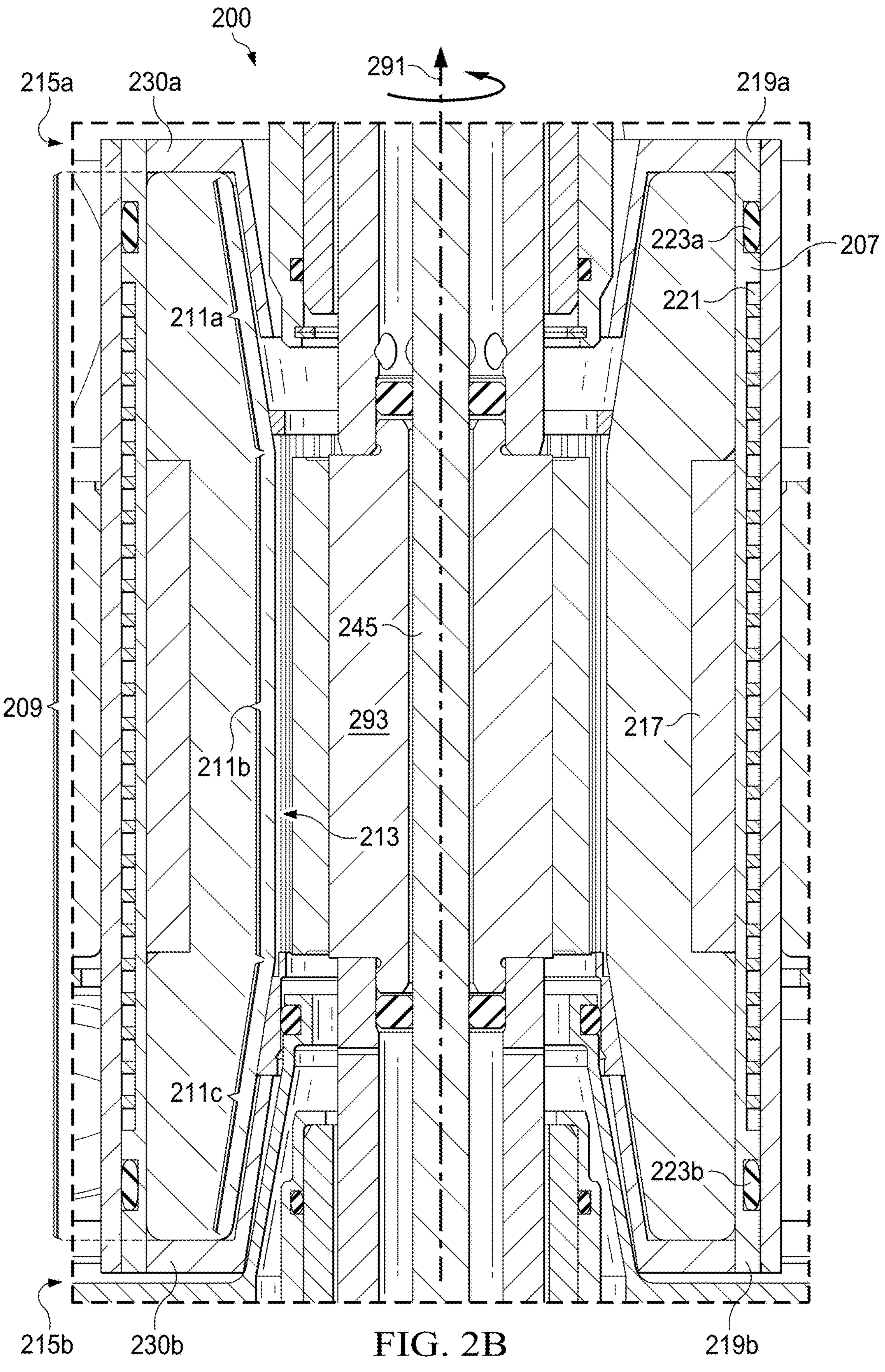
Figure 2C:
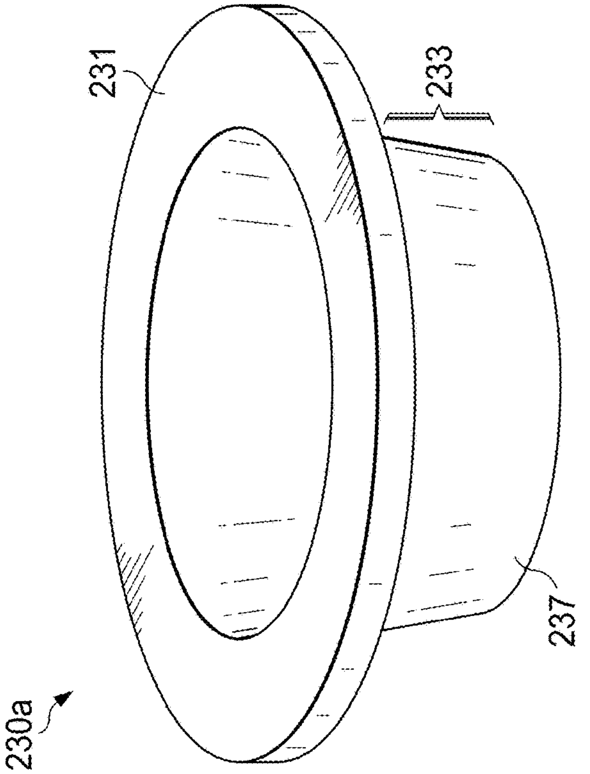
Figure 2C:
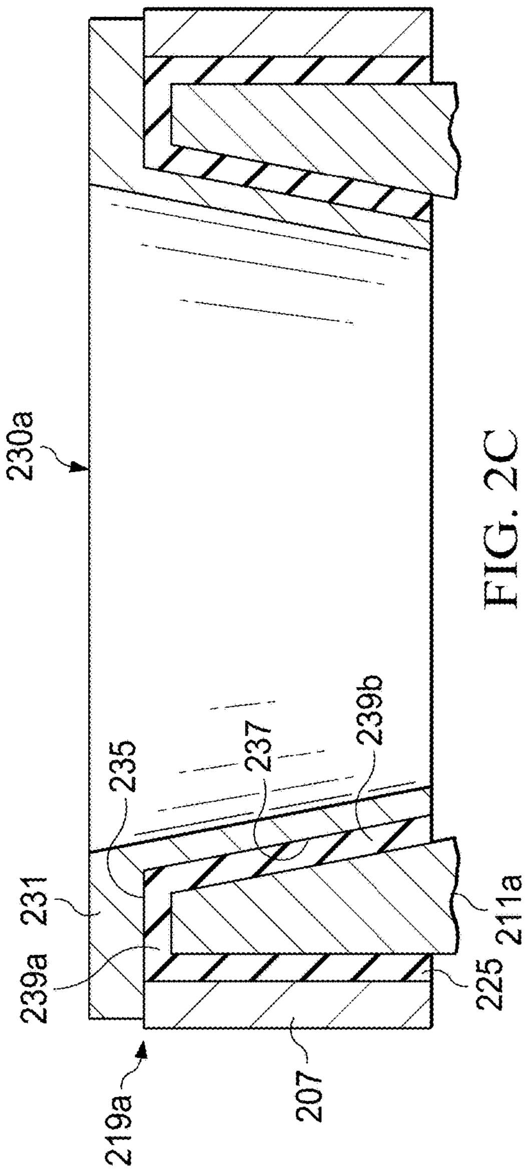
Figure 2D:
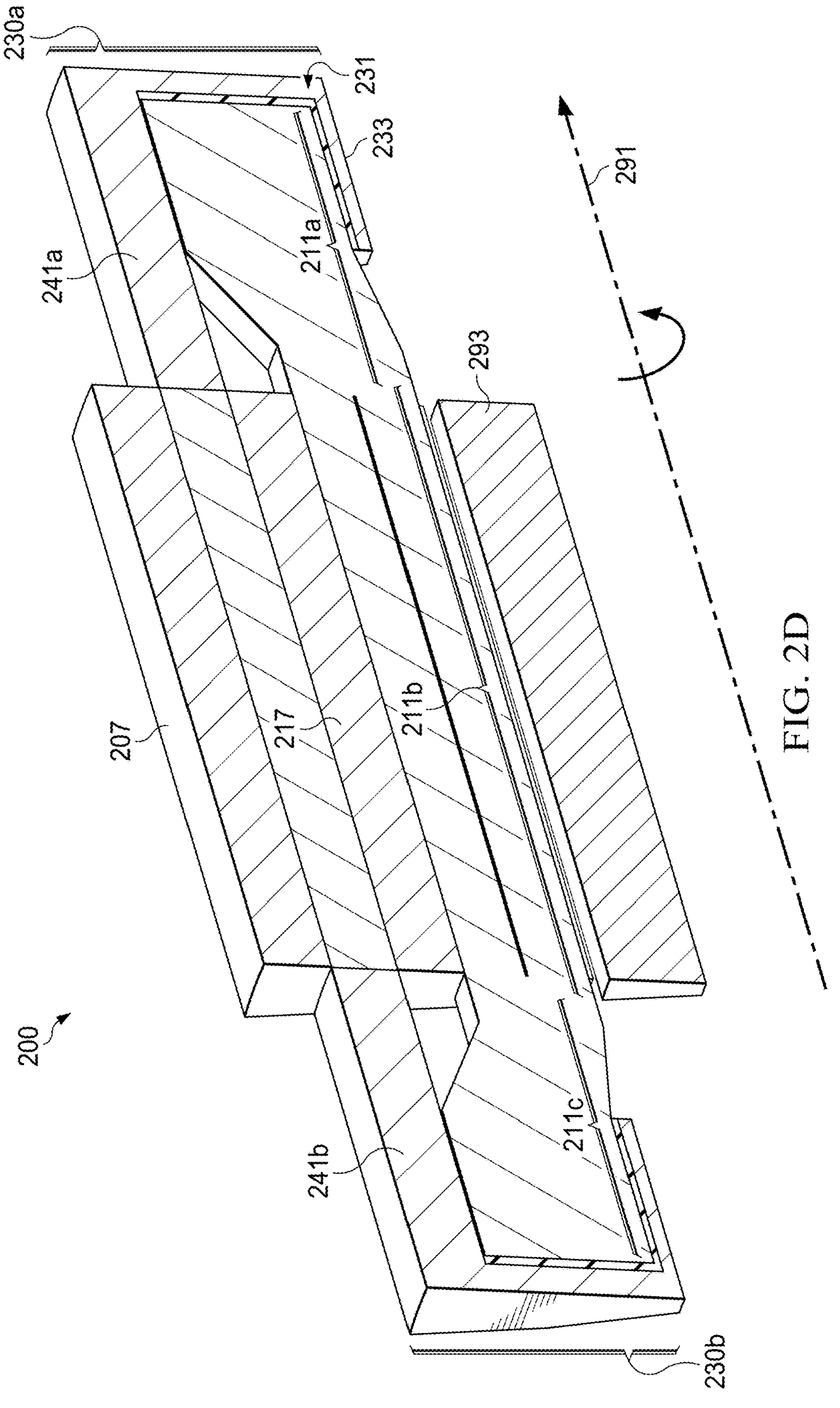
Figure 2E:
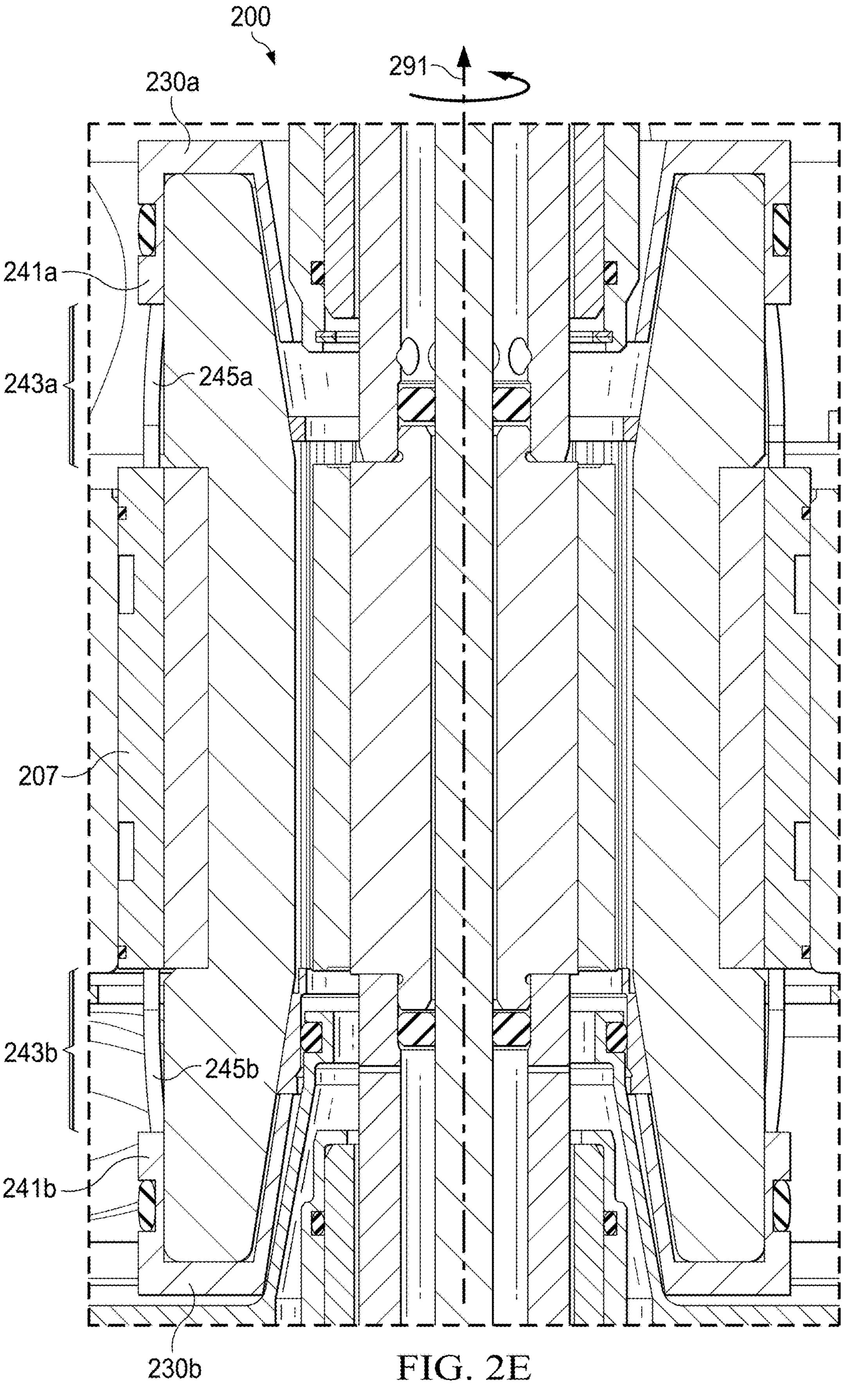
Figure 2F:
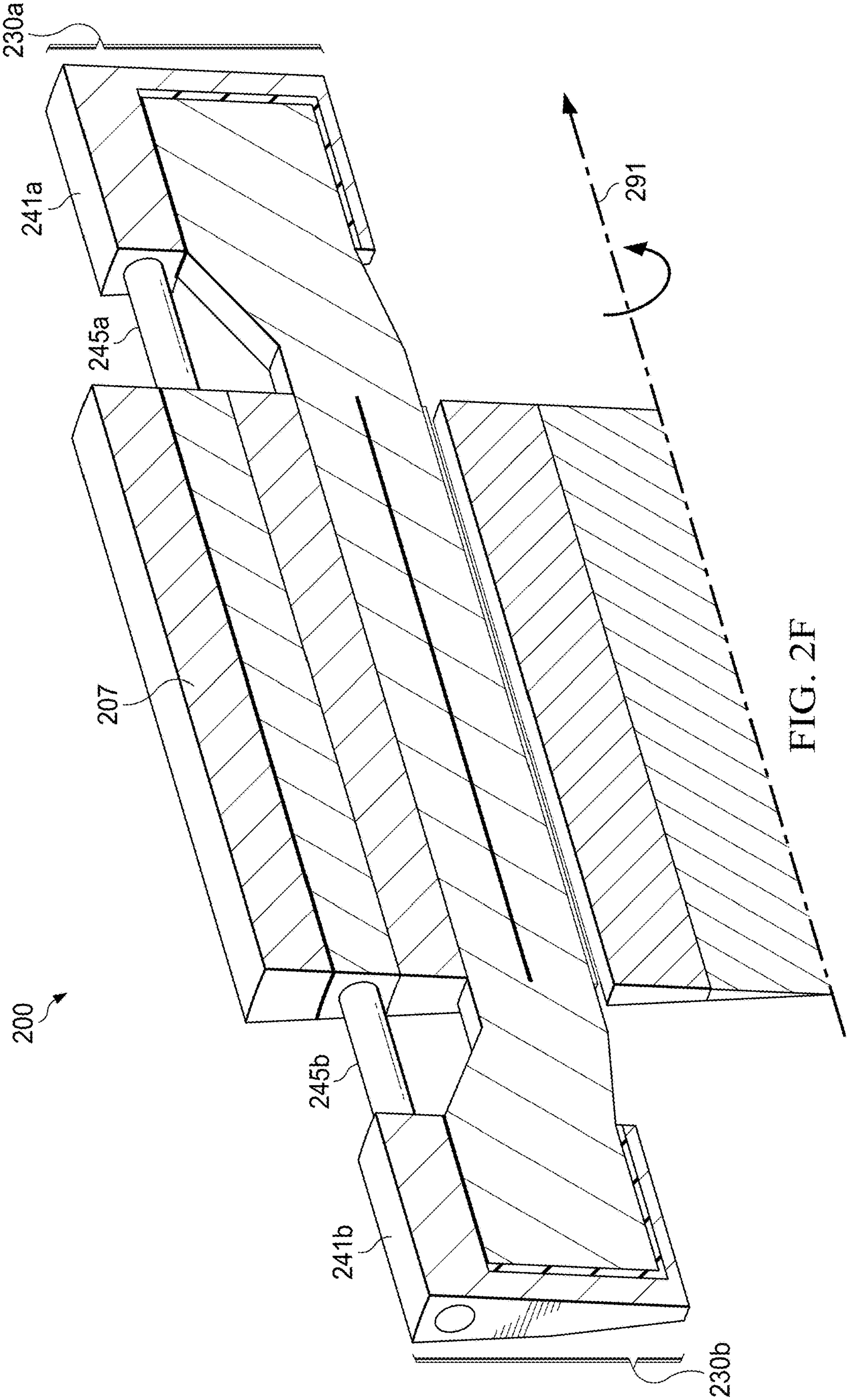
Figure 2G:
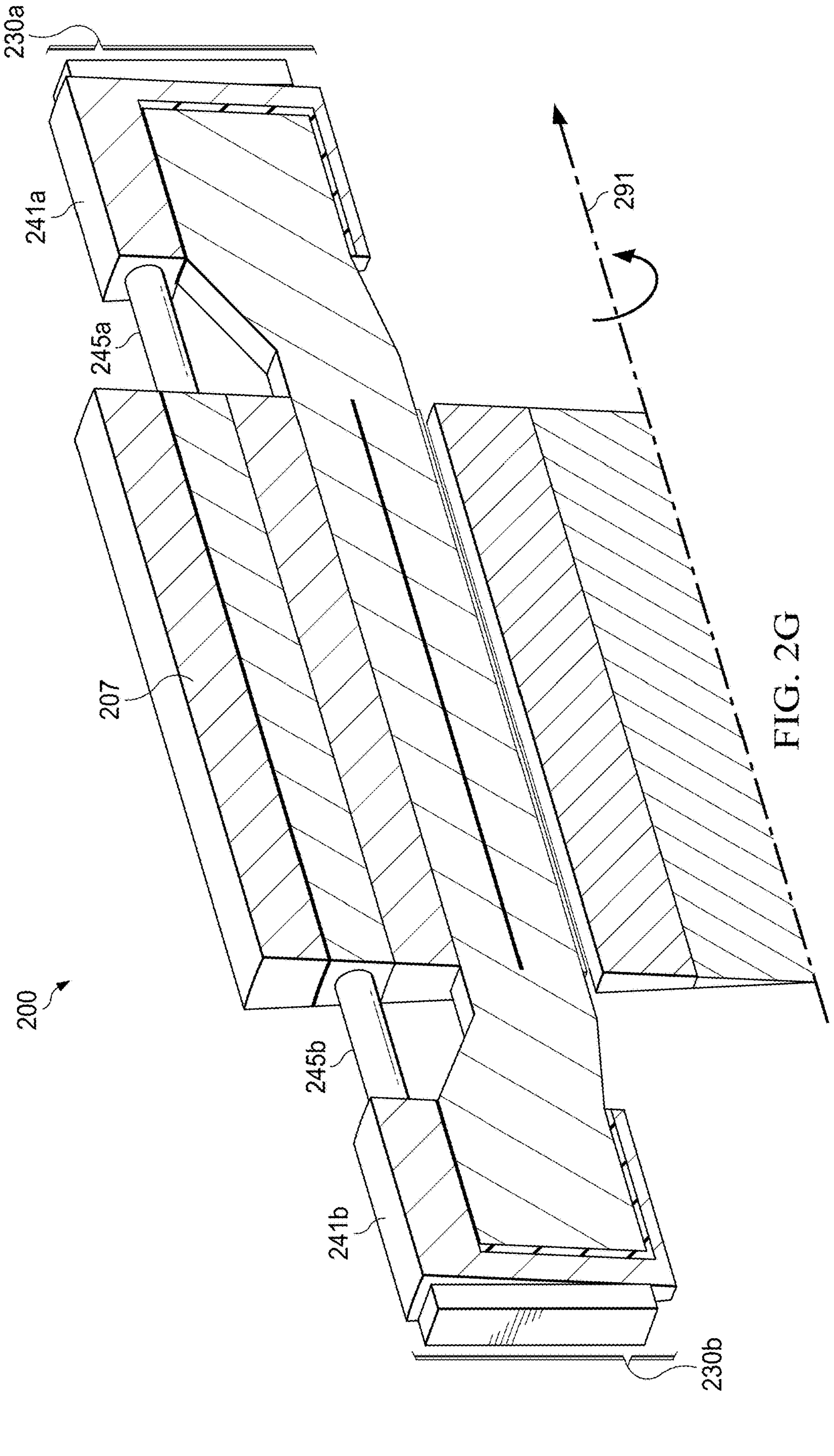
Figure 3:
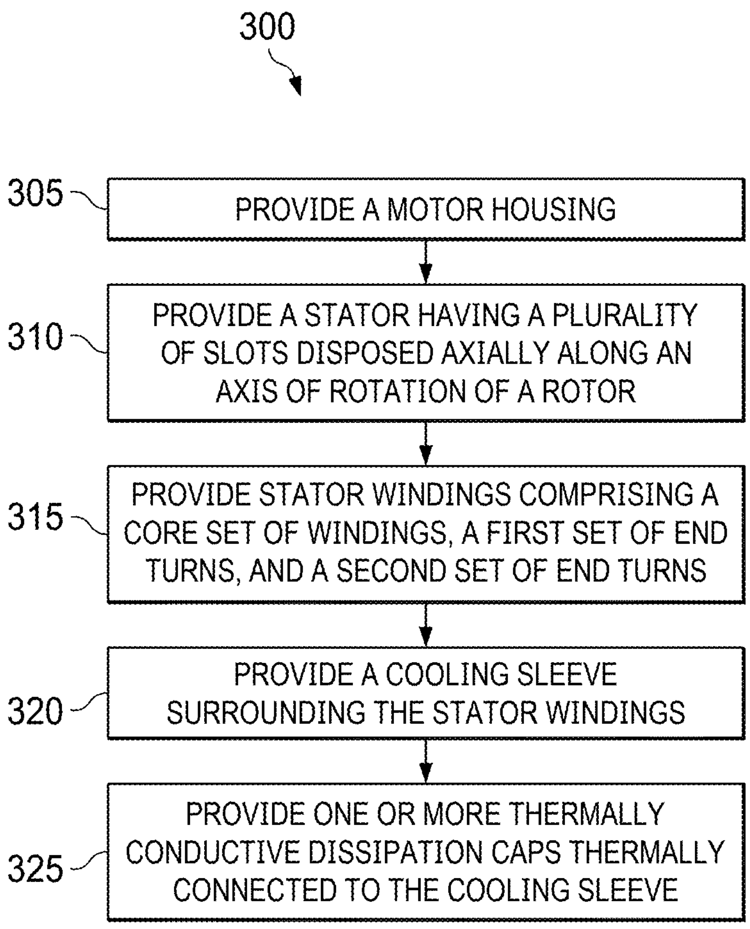
FIG. 3 illustrates an example method according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, certain aircraft components, most notably, compressors rely on high-speed AC electrical motors for their driving power. To achieve the requisite rotational speed, the underlying physics of electrical induction makes low-pole motors a strongly preferable design choice. For example, a two-pole motor completes a full 360-degree revolution over a single polarity switch, whereas a four-pole motor only rotates 180 degrees over a single polarity switch. Thus, all other things being equal, fewer poles translates to more rotational speed.

However, while the end-turns of a motor do not, by themselves, produce an electromagnetic force, the coil pitch of the end-turns affects the electromagnetic field in the core of the motor, and achieving a suitable coil pitch in a two-pole motor requires longer end-turn windings. Again, all other things being equal, a two-pole motor will have more insulated wire in its end-turns than a comparable motor with more than two poles. Thus, end-turns with comparatively larger volumes of insulated wire represent a generally unavoidable design consequence of designing motors for maximum speed.

As background and to illustrate certain technical problems addressed by embodiments according to this disclosure, FIG. 1 shows a heat map of a cross section of a two-pole motor 100 which does not utilize thermal management methods and apparatus of this disclosure. Motor 100 comprises a stator 101 disposed within a housing 103. The stator has windings around the slots of the core (for example, slot 105) as well as end turn windings which extend upwards and radially outwards from the center of the core and occupy region 107 within housing 103. Housing 103 further comprises a first port 109*a*, which is configured to receive cooling air from a ram air supply fed by fast-moving external air when the aircraft is in flight. Housing 103 also comprises a second port 109*b*, which is configured to receive cooling air from an onboard supply of compressed air during high temperature/low-airflow situations, such as when the aircraft is parked or taxiing.

As indicated by the closed shapes indicating isotherms within housing 103, region 107 is, despite the supply of cooling air from either first port 109*a* or second port 109*b*, significantly hotter than regions within housing 103 more proximate to first and second ports 109*a* and 109*b*. During taxi and low-airflow operating scenarios, the measured and modeled temperatures for region 113 hovers around 140° C., while the temperature in region 111 hovers around 190° C., as the flow of cooling air from first port 109*a* and second port 109*b* past the windings in region 111 is comparatively weaker than in other areas within housing 103. Experience indicates that, when maintained at temperatures above 140C° typical insulation materials (for example, baked epoxies) suitable for use in high-speed motors experience thermal degradation, with the rate of degradation doubling with each additional increment of 10° C. above 140° C. Thus, in this example, the insulation on the end-turn wires in region 111 would be expected to wear out approximately sixteen times faster than those in region 113, presenting an unwanted risk of motor 100 burning out due to short circuits from thermally degraded insulation.

FIGS. 2A through 2G illustrate examples of a motor 200 utilizing dissipation caps and cooling sleeves according to embodiments of this disclosure. For consistency and convenience of cross-reference, elements common to more than one of FIGS. 2A through 2G are numbered similarly.

FIG. 2A shows a compressor 205, which includes motor 200. In this example, compressor 205 is a centrifugal compressor, comprising a first impeller 299*a* and a second impeller which are driven by a driveshaft 295. In this example, a common housing 201 houses both the internals of compressor 205 and motor 200, though embodiments in which motor 200 is housed separately from the one or more components it drives are possible, and within the contemplated scope of this disclosure. As shown in the figures, housing 201 further comprises one or more ports, such as port 203, for the admission and exhaust of cooling air from a ram air supply (for example, like first port 109*a* in FIG. 1) and/or an onboard supply of compressed air (for example, as described with reference to second port 109*b* in FIG. 1). The cooling air provided through first, second and third ports enters housing 201 and, at a minimum, passes over an exterior portion of motor 200, thereby drawing off heat generated through the passage of electrical current through the windings of motor 200.

FIG. 2B provides a detailed cross-sectional view of an example motor 200, including cooling sleeve 207 and first and second thermally conductive dissipation caps 230*a* and 230*b*, according to this disclosure. FIG. 2C provides a detailed view of thermally conductive dissipation cap 230*a*.

As described with reference to FIG. 1, the challenges associated with providing high-speed, low-pole AC motors is that such motors have, compared to motors with more poles, more insulated wire in the end turn region that is susceptible to destructive heat buildup. As described herein, certain embodiments according to this disclosure provide improved heat management for such motors through the use of a cooling sleeve which is, at a minimum, thermally connected to one or more thermally conductive dissipation caps thermally connected to end-turn windings and the cooling sleeve. Accordingly, heat in the end-turn windings is drawn off into the thermally conductive dissipation caps, and then to the cooling sleeve. In this way, while the end-turn windings may generate more heat or experience an inferior flow of cooling air from port 203 than other portions of motor 200, the combined action of the thermally conductive dissipation caps and cooling sleeve means that the temperature in the "hot pockets" of the motor assembly (for example, region 111 in FIG. 1) can be reduced by 40° C. or more, thereby maintaining motor windings significantly below the temperature regime (for example, 180° C. or greater) associated with accelerated degradation of insulation.

Referring to the explanatory example of FIG. 2B, motor 200 comprises a rotor 293, which is connected to driveshaft 295. Rotor 293 is configured to rotate around axis of rotation 291 in response to a magneto-motive force generated in an air gap between rotor 293 and the windings of insulated wire on a plurality of slots of stator 209. In this example, the windings of insulated wire on stator 209 can be provided in a low-pole (for example, two or four poles) configuration, wherein each winding comprises a set of core windings 211*b* which are disposed across air gap 213 from rotor 293, Each winding further comprises a first set of end turns 211*a* at a first end 215*a* of stator 209, and a second set of end turns 211*c* disposed at a second end 215*b* of stator 209. As shown in the figure, first set of end turns 211*a* and second set of end turns 211*c* are axially adjacent to core windings 211*b*. In this illustrative example, motor 200 further comprises a back iron 217, comprising a section of iron or other ferromagnetic material supporting the slots of stator 209 proximate to core windings 211*b*.

Skilled artisans will appreciate that, during the normal operation of motor 200 in generating a magneto-motive force to driveshaft 295 and impellers 299*a* and 299*b*, the passage of electrical current through core windings 211*b*, first end turn winding 211*a* and second end turn 211*c* necessarily results in Joule heating, raising the temperature of motor in and around the current-carrying wires carried on stator 209.

To remove the accumulated heat due to Joule heating in the windings of motor 200, stator 209 is disposed within a cooling sleeve 207, which can be a cylindrical section of thermally conductive material, such as stainless steel (for example, SS-300 stainless steel) which surrounds stator 209 around core windings 211*b*, and depending on embodiments, extend axially towards first end turn 211*a* and second end turn 211*c*, terminating at a first opening 219*a* proximate to first end turn 211*a*, and a second opening 219*b* proximate to second end turn 211*c*. In some embodiments, cooling sleeve 207 comprises one or more cooling channels 221 through which a liquid coolant can circulate to, from and within cooling sleeve 207. Suitable coolants include, without limitation, oil, and dielectric liquid coolants (for example, diethyl benzene [DEB], dibenzyl toluene, diaryl alkyl, partially hydrogenated terphenyl, silicate esters, and silicone oil). As shown in the figures, one or more o-rings 223*a* and 223*b* can be used to seal the coolant within cooling sleeve 207. Further examples of suitable coolants include, without limitation, water-based coolants (for example, ethylene glycol or propylene glycol) and refrigerants.

As shown in FIGS. 2B and 2C, the interior of cooling sleeve 207 is dimensioned to generally conform to an exterior profile of core windings 211*b*, and first and second end turn 211*a* and 211*c*, but not necessarily touch (i.e., be in thermally conductive contact with) the actual windings. To ensure thermal conduction between cooling sleeve 207 and the heat generating windings of motor 200, a layer of dielectric film, or a dielectric pad 227 is disposed between the windings (for example, first end turn winding 211*a* and cooling sleeve 207) such that dielectric pad 227 fills any gaps between cooling sleeve 207 and the winding and pulls heat from the windings to the cooling sleeve. Examples of materials suitable for dielectric pad 227 include, without limitation, poly-oxydiphenylene-pyromellitimide based films (for example, KAPTON®), $Al_2O_3$-based ceramic films, or AlN-based ceramic films.

As shown in FIGS. 2B and 2C, motor 200 further comprises one or more thermal dissipation caps, including first thermally conductive dissipation cap 230*a* disposed near first end turn winding 211*a* and second thermal dissipation cap 230*b* disposed near second end turn 211*c*. In this example, of first and second thermal dissipation caps 230*a* and *b* comprises an annular (i.e., having a hole in the middle for driveshaft 295 to pass through) section of thermally conductive material, such as aluminum, or aluminum nitride (AlN), which includes a flange 231 and a frustum portion 233. It should be noted that, in some embodiments, flange 231 can be omitted and first or second thermally conductive dissipation caps 230*a* and 230*b* can have a flat, annular shape. Flange 231 comprises an interior surface 235, which is proportioned to mate with an axial end of either the first or second set of end turns. Similarly, frustum portion 233 comprises a second interior surface 237 which is configured to mate with an interior (i.e., closer to driveshaft 295) portion of the end turns. As with the cooling sleeve 207, one or more dielectric pads or layers of thermally conductive material 239*a* and 239*b* can be interposed to fill the gap between end-turn windings and first and second interior surfaces 235 and 237 and maintain conductive thermal contact between the end-turn windings and thermally conductive dissipation caps 230*a* and 230*b*.

During operation, Joule heat generated in the end turn windings (for example, first end turn 211*a*) conductively flows into the dissipation caps (for example, first thermally conductive dissipation cap 230*a*), and is then further directed to cooling sleeve 207. In this way, certain embodiments according to this disclosure provide enhanced heat rejection of Joule heat developed in the windings (in particular, the end-turns) of motor 200, by "painting the corners" of the cooling coverage by providing a thermally conductive path from the thermally conductive dissipation paths to cooling sleeve 207 which can be liquid cooled and/or more directly in the air flow path of the air ports (for example, port 203 in housing 201).

Depending on embodiments, the thermally conductive path from thermally conductive dissipation caps 230*a* and 230*b* to cooling sleeve 207 can be provided by a variety of structures. In the example of FIGS. 2A-2C, flange 231 directly contacts cooling sleeve 207 along first opening 219*a* and second opening 219*b*. Thus, the outer edges of cooling sleeve 207 are the points of thermal contact between thermally conductive dissipation caps 230*a* and 230*b* and cooling sleeve 207. However, the present disclosure encompasses additional embodiments, including embodiments in which cooling sleeve 207 does not extend to the axial ends of either first end-turn winding 211*a* or second end-turn 211*c*.

FIG. 2D illustrates, in partial cutaway view, an example embodiment showing alternative structure for thermally conductive path from first and second thermally conductive dissipation caps 230*a* and 230*b* to cooling sleeve 207 according to this disclosure. As shown in the figure, in the example of FIG. 2D, cooling sleeve 207 is axially shorter compared to the embodiments shown in FIGS. 2A-2C and is generally coextensive with back iron 217 and core windings 211*b* and does not, by itself reach the flanges of first and second thermally conductive dissipation caps 230*a* and 230*b*. Accordingly, and as shown in FIG. 2D, both first and second thermally conductive dissipation caps 230*a* and 230*b* comprise first and second back iron sleeves 241*a* and 241*b*, respectively. As shown in the figure, each of back iron sleeves 241*a* and 241*b* extend from the respective flanges of first and second thermally conductive dissipation caps 230*a* and 230*b* to meet at first opening 219*a* and second opening 219*b*, respectively. Testing has confirmed that, in this arrangement, temperature drops in the end turn windings on the order of 30° C. or greater from the temperatures shown in the example of FIG. 1 are observed, meaning that shortening cooling sleeve 207 as shown in FIG. 2D still eliminates the destructive "hot spots" in the end turn windings described with reference to FIG. 1.

FIGS. 2E through 2G illustrate examples of further embodiments according to this disclosure, wherein, instead of thermally connecting first and second thermally conductive dissipation caps 230*a* and 230*b* to cooling sleeve via back iron sleeves 241*a* and 241*b*, motor 200 can be made lighter by replacing some of the material of back iron sleeves 241*a* and 241*b* with heat pipes to connect thermally conductive dissipation caps 230*a* and 230*b* to cooling sleeve 207.

Referring to the illustrative examples of FIGS. 2E through 2G, back iron sleeves 241*a* and 241*b* can be axially shortened (as compared to the example of FIG. 2D), to leave a first gap 243*a* between cooling sleeve 207 and first thermally conductive dissipation cap 230*a* and a second gap 243*b* between cooling sleeve 207 and second thermally conductive dissipation cap 230*b*. As shown in the figures, instead of a full, cylindrical section of material, sufficient thermal contact to keep the windings of motor 200 outside of the destructive temperature regimes described with reference to FIG. 1 can be achieved by bridging gaps with one or more heat pipes (for example, first heat pipe 245*a* and second heat pipe 245*b*). Each of heat pipes 245*a* and 245*b* can comprise solid or hollow sections (for example, cylindrical, square, or star-shaped (to increase surface area)) of a highly conductive material, such as an aluminum or aluminum nitride.

Depending on embodiments, first and second heat pipes 245*a* and 245*b* can connect to first and second thermally conductive dissipation caps 230*a* and 230*b* at back iron sleeves 241*a* and 241*b*, as shown in FIGS. 2E and 2F. Additionally, or alternatively, first and second heat pipes 245*a* and 245*b* can extend to flange 231 for enhanced heat removal in the axially outermost portions of the end turns, as shown in FIG. 2G. While the illustrative examples of FIGS. 2E through 2G show embodiments with only two heat pipes, the present disclosure contemplates and encompasses with more (for example, ten) heat pipes.

FIG. 3 illustrates operations of an example method 300 for providing thermal management of an electric motor according to this disclosure.

Referring to the non-limiting example of FIG. 3, at operation 305, a housing for a motor (for example, housing 201) is provided. Depending on embodiments, the housing provided at operation 305 can include one or more ports for the passage of cooling air (for example, ram air, or air from a compressed air supply). In some embodiments, the housing provided at operation 305 can be integral with one or more components driven by the motor (such as a compressor).

At operation 310, a stator is provided, the stator comprising a plurality of slots disposed axially along an axis of rotation of a rotor configured to spin in an air gap between an interior portion of the stator and the exterior of the rotor. In certain embodiments, the stator provided at operation 310 is a "low-pole" stator and configured to be wound with only two or four poles, in order to maximize the angular travel of the rotor between phase switches.

At operation 315, stator windings according to the pole structure (for example, two or four pole) of the stator are provided. The stator windings provided at operation 315 comprise a core set of windings which are radially adjacent to the rotor of the motor, as well as a first set of end turns, which are axially adjacent to the core set of windings and disposed proximate to a first end of the stator. The stator windings provided at operation 315 also comprise a second set of end turns, which are axially adjacent to the core set of windings and disposed proximate to a second end of the stator, such that the first set of end turns is axially separated from the second set of end turns by the core set of windings.

At operation 320, a cooling sleeve (for example, cooling sleeve 207 in FIGS. 2A-2G) is provided, such that the cooling sleeve surrounds the stator windings. The cooling sleeve can surround the core set of windings, and in some embodiments, the cooling sleeve extends axially beyond the core set of windings, either partly, or all the way to the ends of the end turns.

At operation 325, one or more thermally conductive dissipation caps are provided, wherein each of the one or more thermally conductive dissipation caps are thermally connected to the cooling sleeve. As described with reference to FIGS. 2A-2G, embodiments according to this disclosure include, but are not limited to, achieving thermal contact by direct contact between openings of the cooling sleeve and flanges of the one or more thermally conductive dissipation caps (for example, as shown in FIG. 2C, achieving thermal contact via a back iron sleeve contacting a shortened cooling sleeve (for example, as shown in FIG. 2D, or by using one or more heat tubes to bridge a gap between the one or more thermally conductive dissipation caps and the cooling sleeve.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A motor comprising:

a housing;

a stator with a plurality of slots disposed axially along an axis of rotation of a rotor, the stator having a first end and a second end, wherein the first end and the second end are separated along the axis of rotation of the rotor;

stator windings disposed on the plurality of slots, the stator windings comprising a core set of windings, a first set of end turns proximate to the first end, and a second set of end turns proximate to the second end;

a cooling sleeve surrounding the stator windings, the cooling sleeve having a first opening proximate to the first end of the stator and a second opening proximate to the second end of the stator; and a thermally-conductive dissipation cap thermally connected to the cooling sleeve, the thermally-conductive dissipation cap comprising:

a flange comprising a first interior surface configured to mate with an axial end of the first set of end turns; and a frustum connected to the flange and comprising a second interior surface configured to mate with the first set of end turns between the axial end of the first set of end turns and the core set of windings.

2. The motor of claim 1, wherein the cooling sleeve comprises one or more cooling channels for passage of cooling fluid within the cooling sleeve.

3. The motor of claim 1, wherein the thermally-conductive dissipation cap further comprises a back iron sleeve, the back iron sleeve comprising a cylindrical section of thermally-conductive material extending from the flange towards the core set of windings parallel to the axis of rotation.

4. The motor of claim 1, further comprising a heat pipe connecting the cooling sleeve and the thermally-conductive dissipation cap;

wherein the cooling sleeve and the thermally-conductive dissipation cap do not directly contact each other.

5. The motor of claim 1, wherein the rotor is coupled to impellers of a compressor.

6. The motor of claim 1, wherein;

a thermally-conductive dielectric film is disposed between an interior of the cooling sleeve and the stator windings; and the dielectric film contacts both the cooling sleeve and the stator windings.

7. The motor of claim 6, wherein the dielectric film comprises one or more of; a poly-oxydiphenylene-pyromellitimide based film, an aluminum oxide ($Al_2O_3$)-based ceramic film, or an aluminum nitride (AlN)-based ceramic film.

8. A motor comprising:

a housing;

a stator with a plurality of slots disposed axially along an axis of rotation of a rotor, the stator having a first end and a second end, wherein the first end and the second end are separated along the axis of rotation of the rotor;

stator windings disposed on the plurality of slots, the stator windings comprising a core set of windings, a first set of end turns proximate to the first end, and a second set of end turns proximate to the second end;

a cooling sleeve surrounding the stator windings, the cooling sleeve having a first opening proximate to the first end of the stator and a second opening proximate to the second end of the stator;

a thermally-conductive dissipation cap thermally connected to the cooling sleeve; and a heat pipe connecting the cooling sleeve and the thermally-conductive dissipation cap;

wherein the cooling sleeve and the thermally-conductive dissipation cap do not directly contact each other;

wherein the thermally-conductive dissipation cap comprises a back iron sleeve, the back iron sleeve comprising a cylindrical section of thermally-conductive material extending towards the core set of windings parallel to the axis of rotation; and wherein the heat pipe extends from the back iron sleeve towards the cooling sleeve.

9. The motor of claim 8, wherein the heat pipe is "L" shaped and contacts at least a portion of the thermally-conductive dissipation cap.

10. The motor of claim 8, wherein the thermally-conductive dissipation cap comprises:

a flange comprising a first interior surface configured to mate with an axial end of the first set of end turns; and a frustum connected to the flange and comprising a second interior surface configured to mate with the first set of end turns between the axial end of the first set of end turns and the core set of windings.

11. The motor of claim 1, wherein the flange of the thermally-conductive dissipation cap directly contacts the first opening of the cooling sleeve.

12. An apparatus comprising:

a cooling sleeve comprising a section of a thermally-conductive material having a first opening proportioned to accommodate a first end of a stator and a second opening proportioned to accommodate second end of the stator; and a thermally-conductive dissipation cap thermally connected to the cooling sleeve, the thermally-conductive dissipation cap comprising:

a flange comprising a first interior surface configured to mate with an axial end of a set of end turns of the stator; and a frustum connected to the flange and comprising a second interior surface configured to mate with the set of end turns between the axial end of the set of end turns and a core set of windings of the stator.

13. The apparatus of claim 12, wherein the cooling sleeve comprises one or more cooling channels for passage of cooling fluid within the cooling sleeve.

14. The apparatus of claim 12, wherein the flange of the thermally-conductive dissipation cap directly contacts the first opening of the cooling sleeve.

15. The apparatus of claim 12, wherein the thermally-conductive dissipation cap further comprises a back iron sleeve, the back iron sleeve comprising a cylindrical section of thermally-conductive material extending from the flange towards the core set of windings of the stator.

16. The apparatus of claim 12, further comprising a thermally-conductive dielectric film disposed on an interior surface of the cooling sleeve;

wherein the dielectric film is proportioned to simultaneously contact the cooling sleeve and windings of the stator.

17. The apparatus of claim 16, wherein the dielectric film comprises one or more of; a poly-oxydiphenylene-pyromellitimide based film, an aluminum oxide ($Al_2O_3$)-based ceramic film, or an aluminum nitride (AlN)-based ceramic film.

18. The apparatus of claim 12, further comprising a heat pipe connecting the cooling sleeve and the thermally-conductive dissipation cap;

wherein the cooling sleeve and the thermally-conductive dissipation cap do not directly contact each other.

19. The apparatus of claim 18, wherein;

the thermally-conductive dissipation cap comprises a back iron sleeve, the back iron sleeve comprising a cylindrical section of thermally-conductive material extending towards the core set of windings of the stator; and wherein the heat pipe extends from the back iron sleeve towards the cooling sleeve.

20. The apparatus of claim 19, wherein the heat pipe is "L" shaped and contacts at least a portion of the thermally-conductive dissipation cap.

* * * * *